(No Model.)

R. H. CASSWELL.
MILK PURIFIER.

No. 517,814. Patented Apr. 3, 1894.

Witnesses
A. Edmunds
Jas. E. Edmunds

Inventor
Richard H. Casswell
By P. J. Edmunds
Att'y

UNITED STATES PATENT OFFICE.

RICHARD H. CASSWELL, OF INGERSOLL, CANADA, ASSIGNOR TO CHARLES H. SLAWSON AND STEPHEN KING, OF SAME PLACE, AND JOHN S. PEARCE, OF LONDON, CANADA.

MILK-PURIFIER.

SPECIFICATION forming part of Letters Patent No. 517,814, dated April 3, 1894.

Application filed July 6, 1891. Renewed December 9, 1893. Serial No. 493,450. (No model.) Patented in Canada April 9, 1889, No. 31,069.

*To all whom it may concern:*

Be it known that I, RICHARD H. CASSWELL, a subject of the Queen of Great Britain, and a resident of Ingersoll, in the Province of Ontario, Canada, have invented certain new and useful Improvements in Milk-Purifiers, (for which I have obtained a patent in Canada, No. 31,069, bearing date April 9, 1889,) of which the following is a full, clear, and exact description.

My invention has for its object to improve the construction of milk purifiers, whereby in the process of straining and aerating, the globules are prevented from being crushed and broken by concussion while passing from the strainer into the can in which the milk is transported.

My invention consists of an attachment to milk cans, comprising a straining vessel, funnel-shaped at the bottom, and having an exterior neck provided with a disk suspended below the outlet, to spread the milk in an annular thin film before falling into the can, and a deflector sleeved on the neck, to direct the flow into the can, when exposed to the wind. I attain these objects by the mechanism illustrated in the accompanying drawings, in which—

Figure 1:
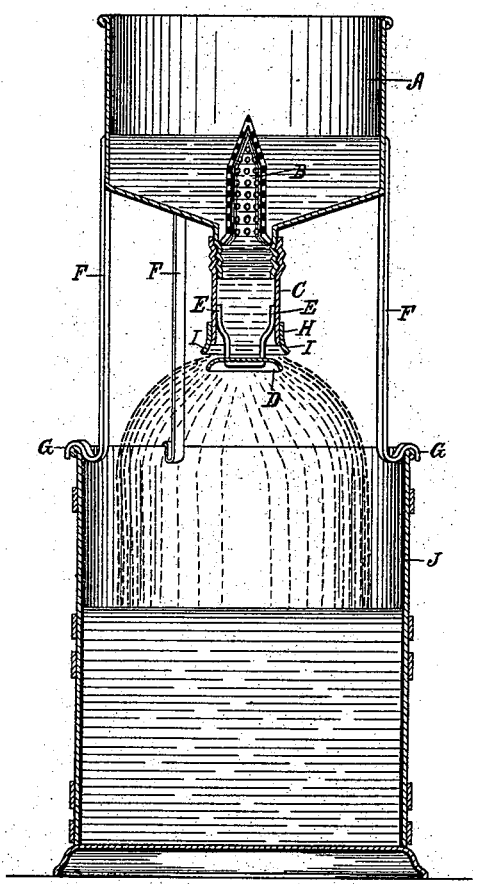
Figure 2:
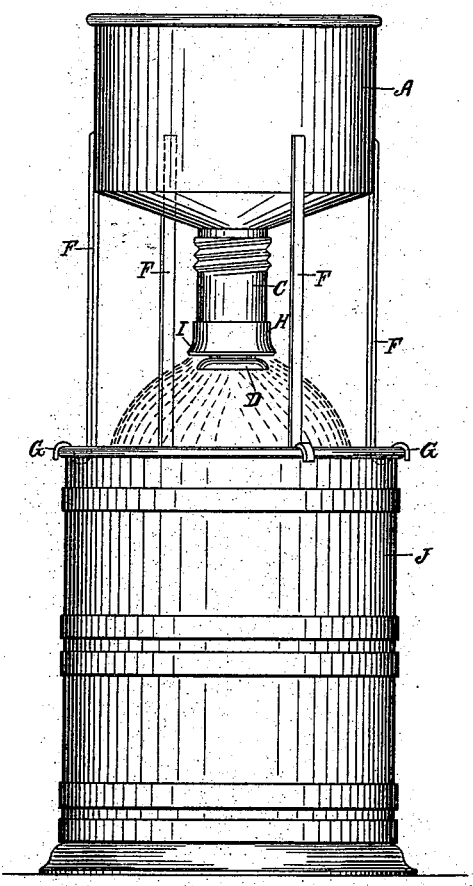

Figure 1. represents a vertical section of my improved strainer and aerator for the purification of milk. Fig. 2. is a side elevation of same.

A, designates the straining vessel, into which the milk to be purified is poured, and said strainer has a funnel-shaped bottom.

B, is a perforated strainer, covering the outlet within the vessel.

C, is a tubular neck, screwing onto a collar secured to the exterior bottom of the vessel at the outlet, and from said neck is suspended a disk, D, offset from the lower end of the neck, and secured fixedly by a U-shaped wire, E, fastened to the inside of the neck, or other suitable manner, so as to leave a clear opening between the lower end of the neck and face of the disk, whereby the milk will flow into the can below in an annular thin film and by contact with the atmosphere aerated and deodorized.

Heretofore the practice has been to allow the milk to escape from the straining vessel through perforations, in small streams, and such practice has been found injurious, which is avoided by my invention. The straining vessel, A, is provided with legs, F, having feet, G, bent to fit on the edge of the milk can, J, in the usual manner.

H, is an adjustable deflector, sleeved on neck, C, and provided with a flaring flange, I, so that by lowering the deflector, the thin film of milk will be prevented from unduly spreading and be directed into the can, and be protected from the wind when occasion may require.

I claim as my invention—

A milk purifier, comprising a vessel, A, supported above a milk receptacle, said vessel, A, having a strainer, B, therein covering the outlet, a neck, C, fixedly secured to the exterior of the vessel, A, a disk, D, fixedly suspended from and offset from said neck, and the adjustable deflector, H, substantially as shown and described and for the purpose specified.

In testimony whereof I affix my signature in the presence of the two undersigned witnesses.

RICHARD H. CASSWELL.

Witnesses:
GEORGE M. JOHNSON,
RICHARD COX.